USO10682701B2

(12) United States Patent
Wilkes et al.

(10) Patent No.: US 10,682,701 B2
(45) Date of Patent: Jun. 16, 2020

(54) APPARATUS FOR PRODUCING A THREE-DIMENSIONAL WORK PIECE WITH IMPROVED GAS FLOW

(71) Applicant: SLM Solutions Group AG, Luebeck (DE)

(72) Inventors: Jan Wilkes, Luebeck (DE); Toni Adam Krol, Luebeck (DE); Dieter Schwarze, Luebeck (DE)

(73) Assignee: SLM Solutions Group AG, Luebeck (DE)

( * ) Notice: Subject to any disclaimer, the term of this patent is extended or adjusted under 35 U.S.C. 154(b) by 743 days.

(21) Appl. No.: 15/248,487

(22) Filed: Aug. 26, 2016

(65) Prior Publication Data

US 2017/0087635 A1     Mar. 30, 2017

(30) Foreign Application Priority Data

Sep. 25, 2015   (EP) .................................... 15186889

(51) Int. Cl.
*B22F 3/105*        (2006.01)
*B23K 26/142*       (2014.01)
(Continued)

(52) U.S. Cl.
CPC ............ *B22F 3/1055* (2013.01); *B23K 26/12* (2013.01); *B23K 26/123* (2013.01);
(Continued)

(58) Field of Classification Search
CPC ......... B33Y 10/00; B33Y 30/00; B33Y 40/00; B23K 26/142; B23K 26/1437;
(Continued)

(56) References Cited

U.S. PATENT DOCUMENTS 6,583,379 B1 *   6/2003   Meiners ................ B22F 3/1055
                                              219/121.6
8,753,105 B2     6/2014   Scott
(Continued)

FOREIGN PATENT DOCUMENTS

CN          102164696 A     8/2011
EP            0785383 A1    7/1997
(Continued)

OTHER PUBLICATIONS

European Search Report, EP15186889.0, SLM Solutions Group AG, dated Mar. 11, 2016, 8 pages.
(Continued)

*Primary Examiner* — Anthony J Zimmer
*Assistant Examiner* — Ricardo D Morales
(74) *Attorney, Agent, or Firm* — Taft Stettinius & Hollister LLP

(57) ABSTRACT

An apparatus for producing a three-dimensional work piece, the apparatus comprises a process chamber accommodating a carrier for receiving a raw material powder, an irradiation device for selectively irradiating electromagnetic or particle radiation onto the raw material powder on the carrier in order to produce a work piece made of said raw material powder by an additive layer construction method, a first gas inlet for supplying gas to the process chamber and a gas outlet for discharging gas from the process chamber, wherein the first gas inlet and the gas outlet are configured and arranged in such a manner that a first gas flow across the carrier is generated, a transmission element which allows the transmission of the electromagnetic or particle radiation emitted by the irradiation device into the process chamber, and a second gas inlet for supplying gas to the process chamber, wherein the second gas inlet is configured and arranged in such a manner that a second gas flow in a
(Continued)

Figure 1:
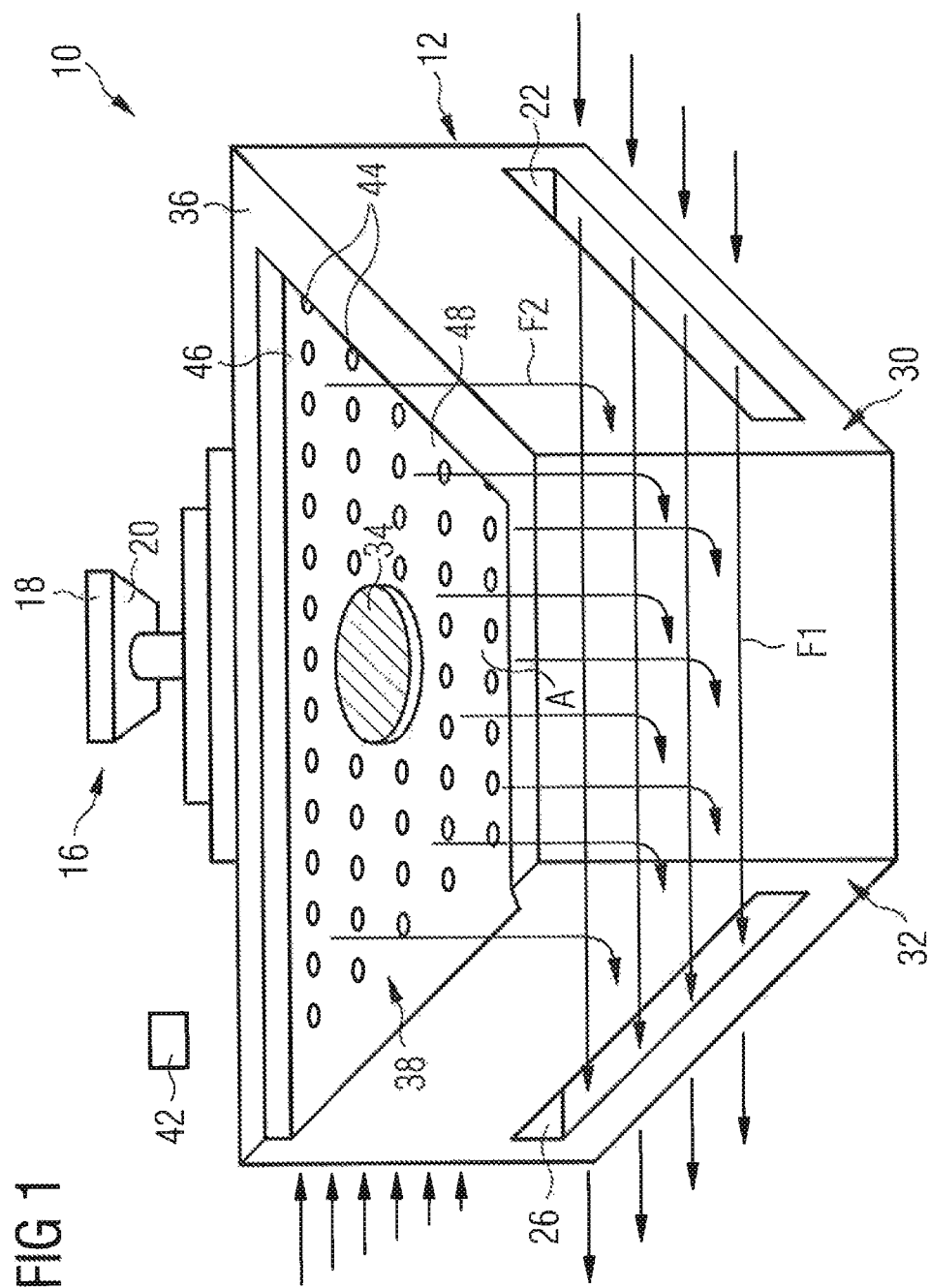

direction facing away from the transmission element is generated.

20 Claims, 4 Drawing Sheets

(51) Int. Cl.
| | |
|---|---|
| B23K 26/12 | (2014.01) |
| B33Y 40/00 | (2020.01) |
| B29C 64/153 | (2017.01) |
| B29C 64/20 | (2017.01) |
| B29C 64/35 | (2017.01) |
| B33Y 10/00 | (2015.01) |
| B33Y 30/00 | (2015.01) |
| B23K 26/342 | (2014.01) |
| B28B 1/00 | (2006.01) |

(52) U.S. Cl.
CPC .......... *B23K 26/142* (2015.10); *B23K 26/342* (2015.10); *B28B 1/001* (2013.01); *B29C 64/153* (2017.08); *B29C 64/20* (2017.08); *B29C 64/35* (2017.08); *B33Y 10/00* (2014.12); *B33Y 30/00* (2014.12); *B33Y 40/00* (2014.12); *B22F 2003/1056* (2013.01); *B22F 2003/1057* (2013.01); *B22F 2003/1059* (2013.01); *B22F 2998/10* (2013.01); *Y02P 10/295* (2015.11)

(58) Field of Classification Search
CPC ..... B23K 26/342; B23K 26/12; B22F 3/1055; B28B 1/001
See application file for complete search history.

(56) References Cited

U.S. PATENT DOCUMENTS

| | | | | |
|---|---|---|---|---|
| 2009/0255912 A1* | 10/2009 | Dietrich | ................ | B33Y 10/00 219/121.86 |
| 2013/0101803 A1* | 4/2013 | Grebe | .................. | B22F 3/1055 428/172 |

FOREIGN PATENT DOCUMENTS

| | | |
|---|---|---|
| EP | 785838 A1 | 7/1997 |
| EP | 1839781 A2 | 10/2007 |
| EP | 1793979 B1 | 2/2009 |
| JP | 58178436 A | 10/1983 |
| JP | 2002530202 A | 9/2002 |
| JP | 5721887 B1 | 5/2015 |
| JP | 5761497 B2 | 8/2015 |
| WO | 9208592 A1 | 5/1992 |
| WO | 9706818 A1 | 2/1997 |
| WO | 2006024373 A2 | 3/2006 |

OTHER PUBLICATIONS

Notification of Reasons for Refusal, JP2016-182724, dated Sep. 26, 2017, 8 pages, with partial translation.
The State Intellectual Property Office of P.R. China, English Translation of CN 1st Office Action dated Sep. 4, 2018 issued in counterpart CN Application No. 201610847783.6 (10 pages).
Patent Office of the Peoples Republic of China, English Translation of CN Search Report dated Aug. 17, 2018 issued in counterpart CN Application No. 201610847783.6 (2 pages).

* cited by examiner

APPARATUS FOR PRODUCING A THREE-DIMENSIONAL WORK PIECE WITH IMPROVED GAS FLOW

The present invention relates to an apparatus for producing a three-dimensional work piece by irradiating layers of a raw material powder with electromagnetic or particle radiation. The invention further relates to a method of operating such an apparatus.

Powder bed fusion is an additive layering process by which pulverulent, in particular metallic and/or ceramic raw materials can be processed to three-dimensional work pieces of complex shapes. To that end, a raw material powder layer is applied onto a carrier and subjected to electromagnetic or particle radiation in dependence on the desired geometry of the work piece that is to be produced. The electromagnetic or particle radiation penetrating into the powder layer causes heating and consequently melting or sintering of the raw material particles. Further raw material powder layers are then applied successively to the layer on the carrier that has already been subjected to radiation treatment, until the work piece has the desired shape and size. Powder bed fusion methods can be used in particular for the production of prototypes, tools, replacement parts or medical prostheses on the basis of CAD data.

An apparatus for producing moulded bodies from pulverulent raw material by a powder bed fusion process is described, for example, in EP 1 793 979 B1. The prior art apparatus comprises a process chamber which accommodates a plurality of carriers for the shaped bodies to be manufactured. A powder layer preparation system comprises a powder reservoir holder that can be moved to and fro across the carriers in order to apply a raw material powder to be irradiated with a laser beam onto the carriers. The process chamber is provided with a protective gas inlet and a protective gas outlet which are connected to a protective gas circuit. Via the protective gas inlet, a protective gas such as, for example, Argon is supplied to the process chamber in order to establish a protective gas atmosphere within the process chamber. Via the protective gas outlet, protective gas which, upon flowing through the process chamber, is loaded with particulate impurities such as, for example, residual raw material powder particles and welding smoke particles is withdrawn from the process chamber.

According to EP 1 839 781 A2, welding smoke generated in a powder bed fusion process upon irradiating and hence melting a raw material powder may contaminate the interior of a process chamber and also components of an irradiation system, such as, for example, a lens or window through which a radiation beam is directed into the process chamber. As a result, a gradually increasing part of the radiation energy emitted by the irradiation system may be absorbed by deposited welding smoke condensate material. EP 1 839 781 A2 therefore proposes to provide a protective gas conveying system with means for generating and maintaining a separation zone in the form of a protective gas flow layer between a product built-up zone and an upper wall of the process chamber which is specified as being almost impenetrable for welding smoke. In particular, the protective gas conveying system comprises an elongated nozzle which extends in a horizontal direction in a side wall of the process chamber. Via the nozzle, a protective gas, which is supplied to the nozzle at an elevated pressure by means of a compressor, is supplied to the process chamber in such a manner that a substantially laminar protective gas flow is generated. An outlet opening through which the protective gas is withdrawn from the process chamber by means of a blower is provided in a further side wall of the process chamber opposite to the nozzle.

The present invention is directed at the object of providing an apparatus for producing a three-dimensional work piece by irradiating layers of a raw material powder with electromagnetic or particle radiation, wherein stable operating conditions during the time of operation can be maintained and thus high-quality work pieces can be produced. Further, the invention is directed at the object of providing a method of operating an apparatus of this kind.

This object is addressed by an apparatus as defined in claim 1 and a method as defined in claim 10.

An apparatus for producing a three dimensional work piece comprises a process chamber accommodating a carrier for receiving a raw material powder. The carrier may be a rigidly fixed carrier having a surface onto which the raw material powder is applied in order to be subjected to electromagnetic or particle radiation. Preferably, however, the carrier is designed to be displaceable in vertical direction, so that, with increasing construction height of a work piece, as it is built up in layers from the raw material powder, the carrier can be moved downwards in the vertical direction. The raw material powder applied onto the carrier within the process chamber is preferably a metallic powder, in particular a metal alloy powder, but may also be a ceramic powder or a powder containing different materials. The powder may have any suitable particle size or particle size distribution. It is, however, preferable to process powders of particle sizes<100 µm.

The apparatus further comprises an irradiation device for selectively irradiating electromagnetic or particle radiation onto the raw material powder on the carrier in order to produce a work piece made of said raw material powder by an additive layer construction method. Hence, the raw material powder applied onto the carrier may be subjected to electromagnetic or particle radiation in a site-selective manner in dependence on the desired geometry of the work piece that is to be produced. The irradiation device may comprise a radiation beam source, in particular a laser beam source, and additionally may comprise an optical unit for guiding and/or processing a radiation beam emitted by the radiation beam source. The optical unit may comprise optical elements such an object lens, in particular and f-theta lens, and a scanner unit, the scanner unit preferably comprising a diffractive optical element and a deflection mirror.

Moreover, the apparatus is provided with a first gas inlet for supplying gas to the process chamber. The gas supplied by the first gas inlet may be an inert gas such as, for example, Argon, Nitrogen or the like. It is conceivable that the process chamber may be sealable against the ambient atmosphere, in order to be able to maintain a controlled atmosphere therein. The controlled atmosphere may be an inert gas atmosphere in order to prevent undesired chemical reactions, in particular, oxidation reactions. Further, the apparatus comprises a gas outlet for discharging gas from the process chamber. The first gas inlet and the gas outlet are configured and arranged in such a manner that a first gas flow across the carrier is generated.

The first gas flow preferably is directed substantially parallel to the carrier so as to ensure that particulate impurities generated in the process chamber upon irradiating the raw material powder on the carrier with electromagnetic or particle radiation are purged from the process chamber by the first gas flow guided through the process chamber from the first gas inlet to the gas outlet. For example, the first gas inlet and the gas outlet may be arranged in the region of opposing side walls of the process chamber. The gas outlet may be connected to a gas discharge line which in turn is connected to a first gas supply line connected to the first gas inlet so as to define a recirculation system to which gas exiting the process chamber via the gas outlet may be recirculated into the process chamber via the first gas inlet. In order to remove the particulate impurities from gas discharged from the process chamber via the gas outlet prior to recirculating the gas into the process chamber via the first gas inlet, a suitable filter arrangement may be provided in the recirculation system.

The apparatus further comprises a transmission element which allows the transmission of the electromagnetic or particle radiation emitted by the irradiation device into the process chamber. The transmission element may, for example, be designed in the form of a window. Alternatively, the transmission element may comprise or consist of an optical element, in particular a lens, of the irradiation device. The transmission element may be arranged in the region of wall of the process chamber, in particular in the region of a top wall of the process chamber. In a particular preferred embodiment of the apparatus, the transmission element is arranged in a region above a center of the carrier. For example, the transmission element may be integrated into a wall, in particular a top wall of the process chamber.

The material of the transmission element may be selected in dependence on the type of the radiation emitted by the irradiation device in order to ensure the desired transmissibility of the transmission element for the electromagnetic or particle radiation emitted by the irradiation device. Further, the material of the transmission element should be selected in such a manner that the transmission element is capable of withstanding the thermal loads acting on the transmission element during operation of the apparatus for producing a three dimensional work piece. For example, the transmission element may be made of a glass material or a suitable polymer material. If desired, the transmission element, in the region of a surface facing the interior of the process chamber, may be provided with a surface layer which minimizes the adhesion and deposition of welding smoke condensate onto the surface of the transmission element.

Finally, the apparatus comprises a second gas inlet for supplying gas to the process chamber. Preferably, the same gas, in particular inert gas is supplied to the process chamber via the first and the second gas inlet. It is, however, also conceivable that different gases are directed into the process chamber via the first and the second gas inlet. The second gas inlet may be connected to a second gas supply line adapted to be flown through with the gas to be supplied into the process chamber via the second gas inlet. The second gas supply line may be connected to the first gas supply line which serves to supply gas to the first gas inlet. It is, however, also conceivable that the second gas supply line is designed independent from the first gas supply line and is, for example, directly connected to a gas source.

The second gas inlet is configured and arranged in such a manner that a second gas flow in a direction facing away from the transmission element is generated. For example, the second gas inlet may be arranged in the region of at least one wall of the process chamber. Preferably, the second gas inlet is arranged adjacent to the transmission element, i.e. in a preferred embodiment of the apparatus, the second gas inlet is arranged at least in the region of the wall of the process chamber which also accommodates the transmission element. In an apparatus wherein the transmission element is arranged in the region of the top wall of the process chamber, the second gas inlet preferably also is arranged at least in the region of the top wall of the process chamber. The second gas flow exiting the second gas inlet may flow away from the transmission element in a direction substantially perpendicular to a wall of the process chamber accommodating the transmission element. Additionally or alternatively thereto, the second gas flow may flow in the direction of the carrier and preferably substantially perpendicular thereto.

By means of the second gas flow, particulate impurities, for example welding smoke rising from the raw material powder applied onto the carrier upon being irradiated with electromagnetic or particle radiation or powder particles, are either prevented from reaching the transmission element or at least guided away from the transmission element. The second gas flow thus constitutes a protective gas flow which protects the transmission element from being contaminated by particulate impurities present in the process chamber. The absorption of radiation energy emitted by the irradiation system by welding smoke condensate material deposited onto the surface of the transmission element thus can be minimized and stable operating conditions can be maintained within the process chamber also during longer times of operation of the apparatus for producing a three dimensional work piece. As a result, high-quality work pieces can be produced without interrupting the operation of the apparatus for cleaning the transmission element. Furthermore, damages to the transmission element due to the deposition of welding smoke condensate can be prevented or at least considerably reduced.

The apparatus for producing a three-dimensional work piece may further comprise a control unit which may be designed in the form of an electronic control unit and which may be adapted to control the supply of gas to the process chamber in such a manner that a volume flow of gas into the process chamber via the second gas inlet is larger than a volume flow of gas into the process chamber via the first gas inlet. This control of the gas supply to the process chamber allows preventing the transmission element from being contaminated in a particularly reliable manner.

The second gas inlet may comprise a plurality of gas inlets openings. By directing the gas to be supplied to the process chamber via the second gas inlet through a plurality of gas inlet openings, the process chamber can be provided with the desired high inlet volume flow of gas at a relatively low gas inlet pressure. As a result, the occurrence of undesired turbulences in the second gas flow which might disturb the raw material powder bed applied onto the carrier and/or the irradiation process can be avoided. Preferably, the plurality of gas inlet openings of the second gas inlet are configured and arranged so as to define a second gas inlet area. For example, the second gas inlet area defined by the gas inlet openings of the second gas inlet may be arranged substantially parallel to the carrier so as to allow the generation of the second gas flow in the direction of the carrier and substantially perpendicular thereto. The size of the second gas inlet area may be substantially equal to or larger than a surface area of the carrier. Such a configuration ensures that welding smoke rising from the raw material powder applied onto the carrier upon being irradiated at any position on the carrier is reliably prevented from reaching and hence contaminating the transmission element.

In a preferred embodiment of the apparatus for producing a three-dimensional work piece, the second gas inlet area comprises a first portion which is arranged in the region of the top wall of the process chamber and a second portion which is arranged in the region of a side wall of the process chamber. In particular, the second portion of the second gas inlet area may be arranged in the region of a side wall of the process chamber which also accommodates the first gas inlet. By such a configuration, the size of the second gas inlet area can be increased, allowing the supply of a particularly high volume flow of gas to the process chamber via the second gas inlet at a particularly low pressure. The second gas inlet area may comprise further portions which may be arranged in the region of further side walls of the process chamber in order to still further increase the second gas inlet area.

The apparatus may further comprise a pressure equalization container which may be arranged in a gas supply line, i.e. the second gas supply line, upstream of the second gas inlet. In this context, the term "upstream" refers to the direction of flow of gas through the gas supply line, i.e. the second gas supply line, connected to the second gas inlet. Thus, the gas to be supplied to the process chamber via the second gas inlet, prior to entering the process chamber, is directed into the pressure equalization container. The pressure equalization container serves to compensate for pressure differences occurring in the gas supply line upstream of the second gas inlet and in the process chamber, for example due to temperature differences developing during operation of the apparatus. Thus, due to the presence of the pressure equalization container, gas can be supplied to the process chamber via the second gas inlet in a particularly uniform manner.

The pressure equalization container may be integrated into a wall of the process chamber. For example, the pressure equalization container may be defined by a hollow space formed in a wall of the process chamber. The pressure equalization container then may be installed in the apparatus in a particularly space saving manner. The second gas inlet may be arranged in a wall of the pressure equalization container which faces the process chamber. Gas to be supplied to the process chamber via the second gas inlet then may easily be directed from the pressure equalization container into the process chamber.

Further, the transmission element may be arranged in the wall of the pressure equalization container which faces the process chamber. A further transmission element which may be designed similar or equal to the transmission element may be arranged in a wall of the pressure equalization container which faces away from the process chamber and which separates the pressure equalization container from the irradiation device. Electromagnetic or particle radiation emitted from the irradiation device then may be directed through the pressure equalization container into the process chamber.

The pressure equalization container may comprise a first portion which is integrated into the top wall of the process chamber and a second portion which is integrated into a side wall of the process chamber. In particular, the second portion of the pressure equalization container may be arranged in the region of a side wall of the process chamber which also accommodates the first gas inlet. This configuration of a pressure equalization container is particularly advantageous in combination with a second gas inlet area comprising a first and a second portion as described above. If desired, the pressure equalization container may comprise further portions which may be arranged in the region of further side walls of the process chamber in order to adapt the design of the pressure equalization container to the design of the second gas inlet area.

Finally, the apparatus may be provided with a further pressure equalization container which is arranged in a further gas supply line, i.e. the first gas supply line, upstream of the first gas inlet. In this context, the term "upstream" refers to the direction of flow of gas through the further gas supply line, i.e. the first gas supply line, connected to the first gas inlet. The gas to be supplied to the process chamber via the first gas inlet, prior to entering the process chamber, then is directed into the further pressure equalization container which serves to compensate for pressure differences occurring in the gas supply line upstream of the first gas inlet and in the process chamber, for example due to temperature differences developing during operation of the apparatus. Thus, the presence of the further pressure equalization container allows gas to be supplied to the process chamber via the first gas inlet in a particularly uniform manner.

In a method for producing a three-dimensional work piece a layer of raw material powder is applied onto a carrier accommodated in a process chamber. Gas is supplied to the process chamber via a first gas inlet. Gas is discharged from the process chamber via a gas outlet. The first gas inlet and the gas outlet are configured and arranged in such a manner that the first gas flow across the carrier is generated. The method further comprises the step of selectively irradiating electromagnetic or particle radiation onto the raw material powder on the carrier by means of the irradiation device in order to produce a work piece made of said raw material powder by an additive layer construction method. The electromagnetic or particle radiation emitted by the irradiation device is transmitted into the process chamber via a transmission element. Gas is supplied to the process chamber via a second gas inlet. The second gas inlet is configured and arranged in such a manner that a second gas flow in a direction facing away from the transmission element is generated.

Preferably, the supply of gas to the process chamber is controlled in such a manner that a volume flow of gas into the process chamber via the second gas inlet is larger than a volume flow of gas into the process chamber via the first gas inlet.

The second gas inlet may comprise a plurality of gas inlet openings which may be configured and arranged so as to define a second gas inlet area.

The second gas inlet area preferably comprises a first portion which is arranged in the region of a top wall of the process chamber and a second portion which is arranged in the region of a side wall of the process chamber. In particular, the second portion of the second gas inlet area may be arranged in the region of a side wall of the process chamber which also accommodates the first gas inlet.

The gas to be supplied to the process chamber via the second gas inlet may be directed through a pressure equalization container which may be arranged in a gas supply line connected to the second gas inlet, i.e. the second gas supply line, upstream of the second gas inlet.

The pressure equalization container may be integrated into a wall of the process chamber. The second gas inlet may be arranged in a wall of pressure equalization container which faces the process chamber. Similarly, the transmission element may be, arranged in a wall of the pressure equalization container which faces the process chamber.

The pressure equalization container may comprise a first portion which is integrated into a top wall of the process chamber and a second portion which is integrated into the side wall of the process chamber. In particular, the second portion of the pressure equalization container may be arranged in the region of a side wall of the process chamber which also accommodates the first gas inlet.

Gas to be supplied to the process chamber via the first gas inlet may be directed through a further pressure equalization container. The further pressure equalization container may be arranged in a further gas supply line connected to the first gas inlet, i.e. the first gas supply line, upstream of the first gas inlet.

Figure 2:
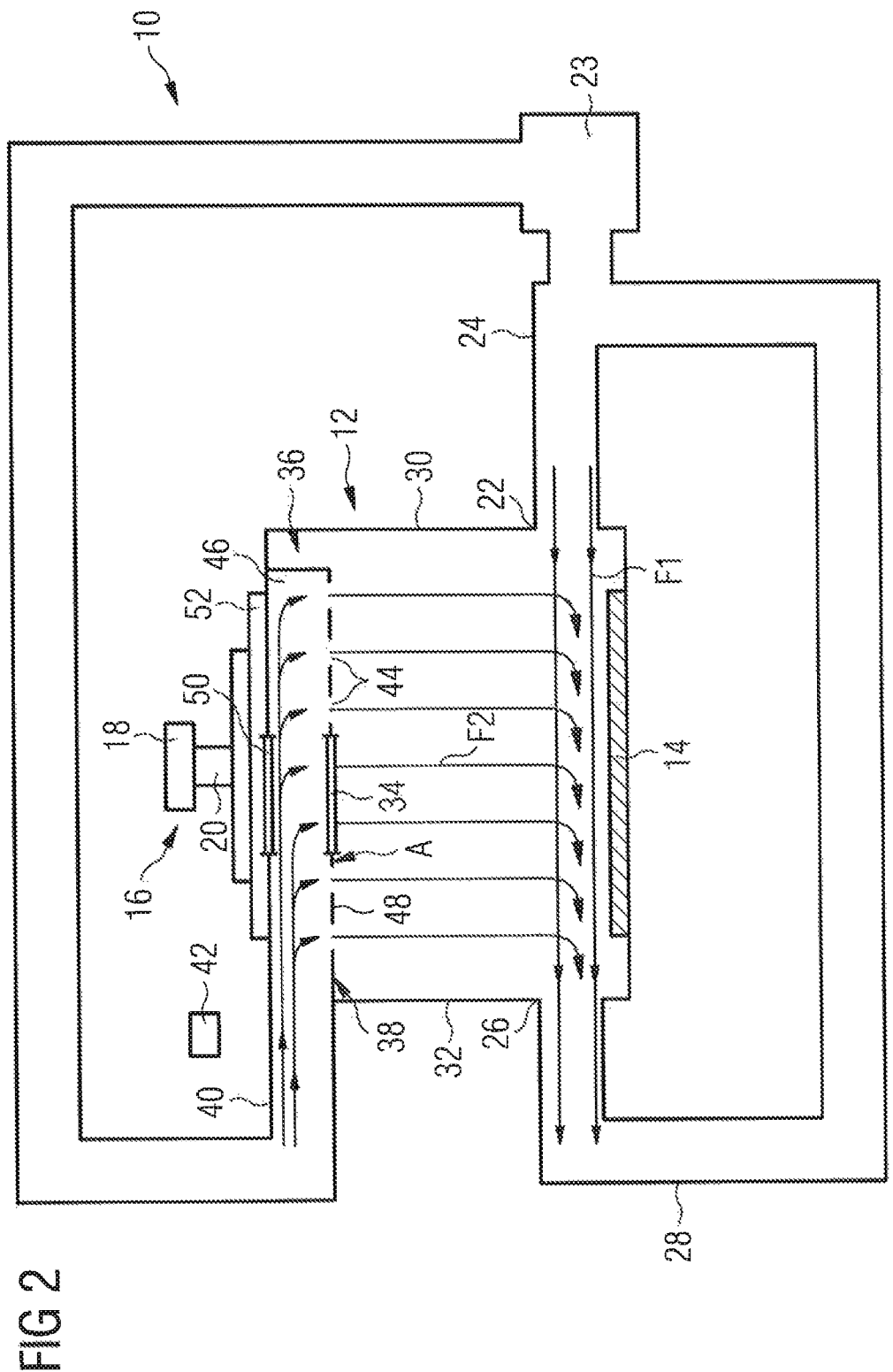
Figure 3:
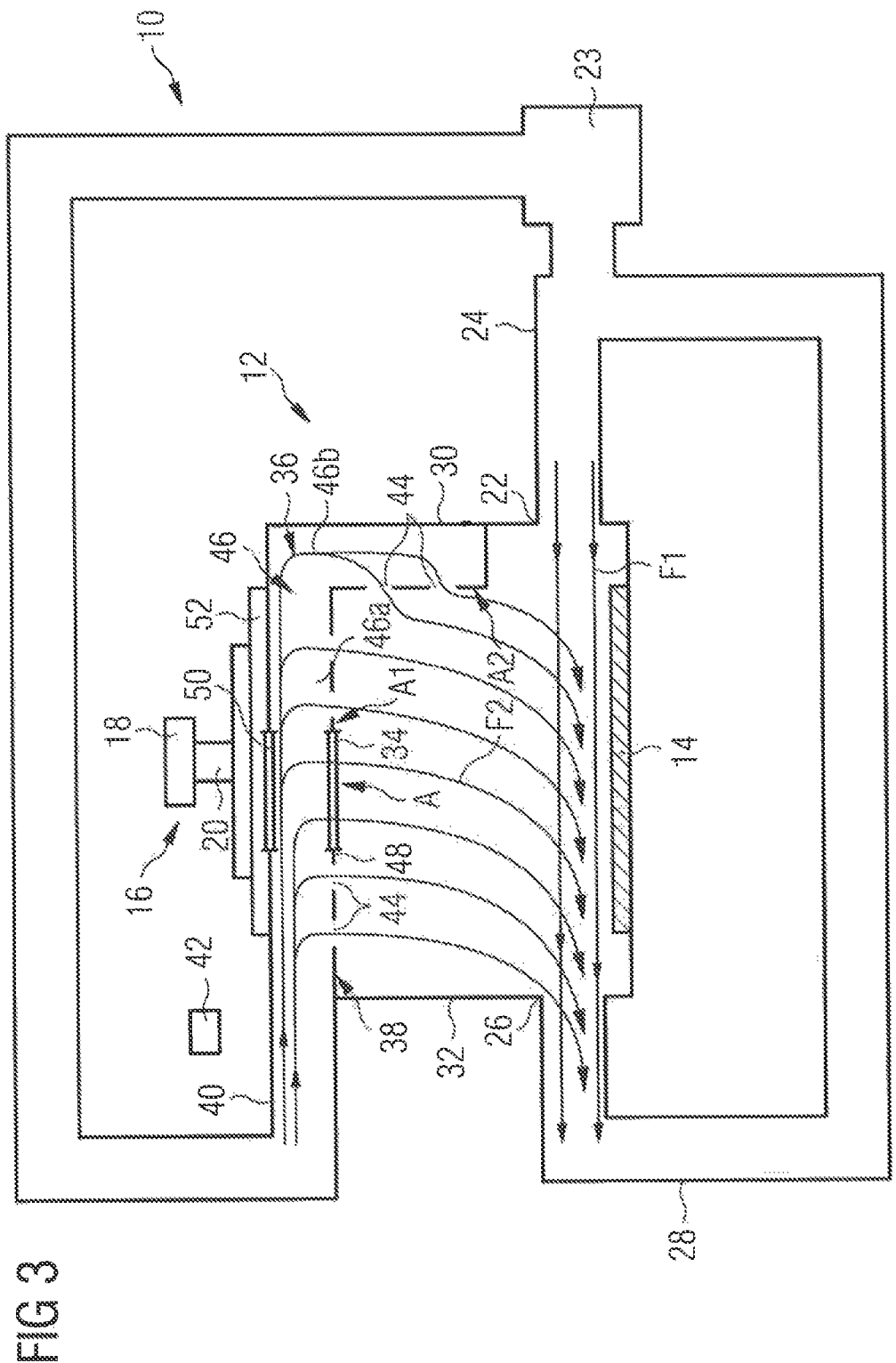
Figure 4:
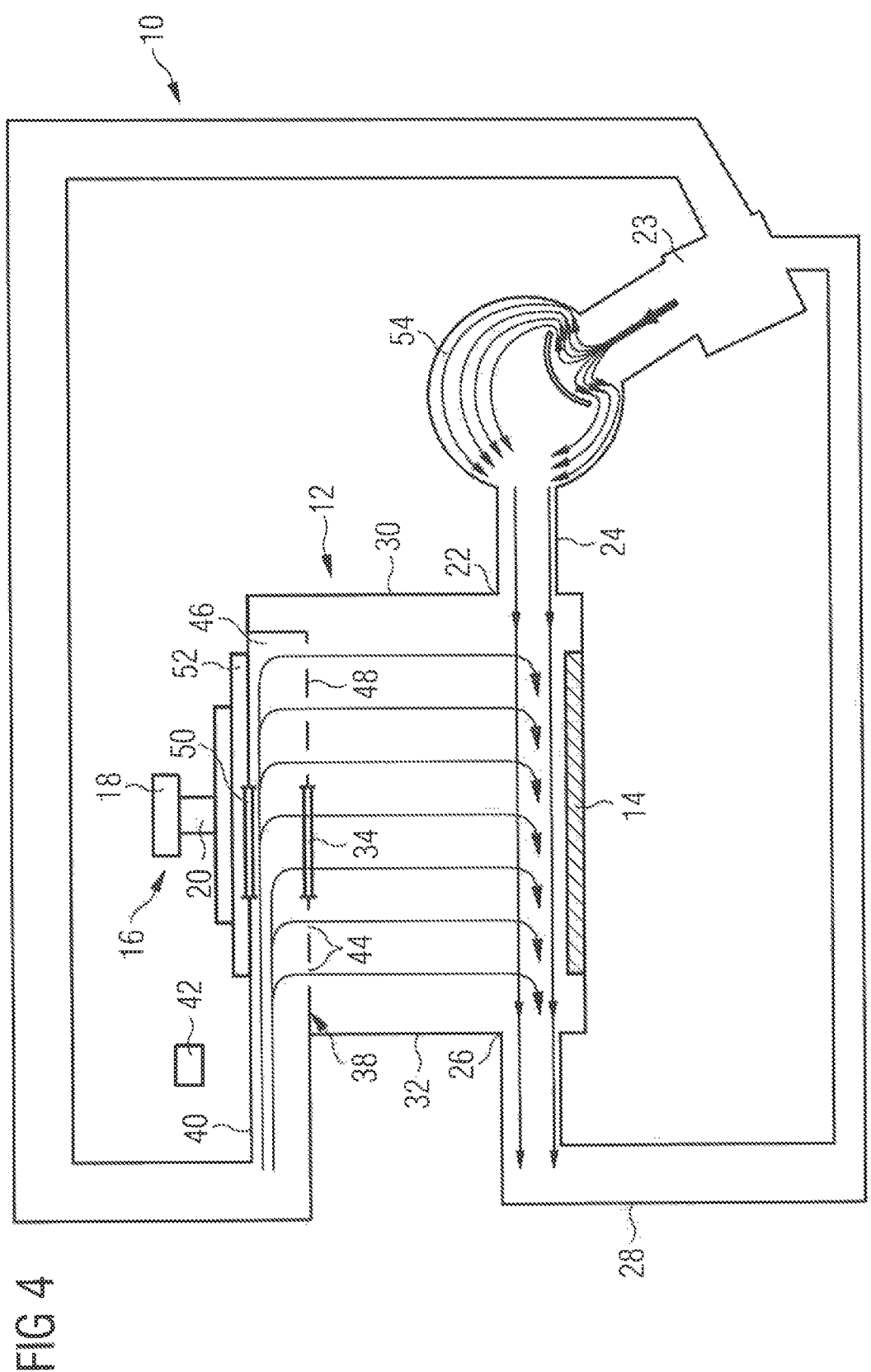

Preferred embodiments of the invention in the following are explained in greater detail with reference to the accompanying schematic drawings, in which:

FIG. 1 shows a schematic three-dimensional representation of a first embodiment of an apparatus for producing a three-dimensional work piece, FIG. 2 shows a schematic cross-sectional view of the apparatus according to FIG. 1, FIG. 3 shows a schematic cross-sectional view of a second embodiment of an apparatus for producing a three-dimensional work piece, and FIG. 4 shows a schematic cross-sectional view of a third embodiment of an apparatus for producing a three-dimensional work piece.

FIGS. 1 and 2 show a first embodiment of an apparatus 10 for producing a three-dimensional work piece by an additive layering process. The apparatus 10 comprises a process chamber 12 accommodating a carrier 14 (see FIG. 2) for receiving a raw material powder. A powder application device (not shown) serves to apply the raw material powder onto the carrier 14. The carrier 14 is designed to be displaceable in a vertical direction so that, with increasing construction height of a work piece, as it is built up in layers from the raw material powder on the carrier 14, the carrier 14 can be moved downwards in the vertical direction.

The apparatus 10 for producing a three-dimensional work piece further comprises an irradiation device 16 for selectively irradiating electromagnetic or particle radiation, in particular laser radiation onto the raw material powder applied onto the carrier 14 in order to produce a work piece made of said raw material powder by an additive layer construction method. In particular, by means of the irradiation device 16, the raw material powder on the carrier 14 may be subjected to electromagnetic or particle radiation in a site selective manner in dependence on the desired geometry of the component that is to be produced. The irradiation device 16 comprises a radiation source 18 which may comprise a diode pumped Ytterbium fibre laser emitting laser light at a wavelength of approximately 1070 to 1080 nm.

The irradiation device 16 further comprises an optical unit 20 for guiding and processing a radiation beam emitted by the radiation source 18. The optical unit may comprise a beam expander for expanding the radiation beam, a scanner and an object lens. Alternatively, the optical unit may comprise a beam expander including a focusing optic and a scanner unit. By means of the scanner unit, the position of the focus of the radiation beam both in the direction of the beam path and in a plane perpendicular to the beam path can be changed and adapted. The scanner unit may be designed in the form of a galvanometer scanner and the object lens may be an f-theta object lens.

The process chamber 12 is sealed against the ambient atmosphere, i.e. against the environment surrounding the process chamber 12. As becomes apparent from the drawings, the process chamber 12 is provided with a first gas inlet 22 for supplying gas from the gas source 23 to the process chamber 12. The gas supplied to the process chamber via the first gas inlet 22 may be an inert gas such as, for example, Argon, Nitrogen or the like. It is however also conceivable to supply the process chamber 12 with air via the first gas inlet 22. The gas is conveyed into the process chamber 12 via the first gas inlet 22 by means of a suitable conveying device such as, for example, a pump or a blower (not shown) which is arranged in a first gas supply line 24.

Gas containing particulate impurities is discharged from the process chamber 12 via a gas outlet 26. The gas outlet 26 is connected to a gas discharge line 28 which in turn is connected to the first gas supply line 24 connected to the first gas inlet 22 so as to define a recirculation system to which gas exiting the process chamber 12 via the gas outlet 26 is recirculated into the process chamber 12 via the first gas inlet 22. In order to remove the particulate impurities from gas discharged from the process chamber 12 via the gas outlet 26 prior to recirculating the gas into the process chamber 12 via the first gas inlet 22, a suitable filter arrangement (not shown) is provided in the recirculation system.

The first gas inlet 22 and the gas outlet 26 are configured and arranged in such a manner that a first gas flow F1 across the carrier 14 is generated. As shown in the drawings, the first gas flow F1 is directed substantially parallel to the carrier 14 so that particulate impurities generated in the process chamber 12 upon irradiating the raw material powder on the carrier 14 with electromagnetic or particle radiation are purged from the process chamber 12 by the first gas flow F1 guided through the process chamber 12 from the first gas inlet 22 to the gas outlet 26. In the embodiment of an apparatus 10 shown in the drawings, this is achieved by arranging a slit-shaped first gas inlet 22 and a slit-shaped gas outlet 26 in the region of opposing side walls 30, 32 of the process chamber 12.

The apparatus 10 further comprises a transmission element 34 which allows the transmission of the electromagnetic or particle radiation emitted by the irradiation device 16 into the process chamber 12. In the apparatus 10 depicted in the drawings, the transmission element 34 is designed in the form of a window made of glass or a polymeric material which is arranged in the region of a top wall 36 of the process chamber 12 above a center of the carrier 14. Thus, a radiation beam emitted by the irradiation device 16 can be guided through the transmission element 34 and across the carrier 14 as desired in dependence on the geometry of the work piece to be produced.

Furthermore, the apparatus 10 comprises a second gas inlet 38 for supplying gas to the process chamber 12. The second gas inlet 38 is connected to a second gas supply line 40 which is flown through with the gas to be supplied into the process chamber 12 via the second gas inlet 38. Like the first gas supply line 24, also the second gas supply line 40 is connected to the gas source 23. Thus, the same gas is supplied to the process chamber 12 via the first and the second gas inlet 22, 38.

The second gas inlet 38 is configured and arranged in such a manner that a second gas flow F2 in a direction facing away from the transmission element 34 is generated. As shown in the drawings, the second gas flow F2 is directed from the top wall 36 of the process chamber 12 which accommodates the transmission element 34 in the direction of the carrier 14 and substantially perpendicular to both the top wall 36 of the process chamber 12 and the carrier 14. In the embodiment of an apparatus 10 shown in the drawings, this is achieved by arranging the second gas inlet 38 in the region of the top wall 36 of the process chamber 12 adjacent to the transmission element 34. By means of the second gas flow F2, particulate impurities, for example welding smoke rising from the raw material powder applied onto the carrier 14 upon being irradiated with electromagnetic or particle radiation or powder particles, are either prevented from reaching the transmission element 34 or at least guided away from the transmission element 34. The second gas flow F2 thus constitutes a protective gas flow which protects the transmission element 34 from being contaminated by particulate impurities present in the process chamber 12.

The supply of gas to the process chamber 12, by means of a control unit 42, is controlled in such a manner that a volume flow of gas into the process chamber 12 via the second gas inlet 38 is larger than a volume flow of gas into the process chamber 12 via the first gas inlet 22. This control of the gas supply to the process chamber allows preventing the transmission element 34 from being contaminated in a particularly reliable manner.

The second gas inlet 38 comprises a plurality of gas inlets openings 44. Hence, the process chamber 12 can be provided with the desired high inlet volume flow of gas through the second gas inlet 38 at a relatively low gas inlet pressure. As a result, the occurrence of undesired turbulences in the second gas flow F2 which might disturb the raw material powder bed applied onto the carrier 14 and/or the irradiation process can be avoided. The plurality of gas inlet openings 44 of the second gas inlet 38 are configured and arranged so as to define a second gas inlet area A which is arranged substantially parallel to the carrier 14 so as to allow the generation of the second gas flow F2 in the direction of the carrier 14 and substantially perpendicular thereto. The size of the second gas inlet area A is substantially equal to a surface area of the carrier 14 so that welding smoke rising from the raw material powder applied onto the carrier 14 upon being irradiated at any position on the carrier 14 is prevented from reaching and hence contaminating the transmission element 34.

The apparatus 10 further comprises a pressure equalization container 46 which is arranged in the second gas supply line 40 upstream of the second gas inlet 38. In this context, the term "upstream" refers to the direction of flow of gas through the second gas supply line 40. By directing the gas to be supplied to the process chamber 12 via the second gas inlet 38 through the pressure equalization container 46 prior to entering the process chamber 12 pressure differences occurring in the second gas supply line 40 and in the process chamber 12, for example due to temperature differences developing during operation of the apparatus 10 can be compensated for.

The pressure equalization container 46 is integrated into a wall of the process chamber 12. In the apparatus 10 according to FIGS. 1 and 2, the pressure equalization container 46 is integrated into the top wall 36 of the process chamber 12 and defined by a hollow space formed in the top wall 36 of the process chamber 12. Thus, the second gas inlet 38 is arranged in a wall 48 of the pressure equalization container 46 which faces the process chamber 12. Further, also the transmission element 34 is arranged in the wall 48 of the pressure equalization container 46 which faces the process chamber 12.

A further transmission element 50 (see FIG. 2) which is designed equal to the transmission element 34 is arranged in a wall 52 of the pressure equalization container 46 which faces away from the process chamber 12 and which separates the pressure equalization container 46 from the irradiation device 16. Electromagnetic or particle radiation emitted from the irradiation device 16 thus can be directed through the pressure equalization container 46 into the process chamber 12.

A second embodiment of an apparatus 10 which is shown in FIG. 3 differs from the apparatus 10 according to FIGS. 1 and 2 in that the second gas inlet area A comprises a first portion A1 which is arranged in the region of the top wall 36 of the process chamber 12 and a second portion A2 to which is arranged in the region of the first side wall 30 of the process chamber 12. In particular, the second portion A2 of the second gas inlet area A is arranged in the region of the first side wall 30 of the process chamber 12 which also accommodates the first gas inlet 22. By providing the second gas inlet area A with a first and a second portion A1, A2, the size of the second gas inlet area A can be increased, allowing the supply of a particularly high volume flow of gas to the process chamber 12 via the second gas inlet 38 at a particularly low pressure.

Furthermore, in the apparatus 10 according to FIG. 3, the pressure equalization container 46 comprises a first portion 46a which is integrated into the top wall 36 of the process chamber 12 and a second portion 46b which is integrated into the first side wall 30 of the process chamber 12. In particular, the second portion 46b of the pressure equalization container 46 is arranged in the region of the first side wall 30 of the process chamber 12 which also accommodates the first gas inlet 22. Otherwise the structure and the function of the apparatus 10 according to FIG. 3 correspond to the structure and the function of the apparatus 10 depicted in FIGS. 1 and 2.

A third embodiment of an apparatus 10 which is shown in FIG. 4 differs from the apparatus 10 according to FIGS. 1 and 2 in that the apparatus 10 depicted in FIG. 4 is provided with a further pressure equalization container 54 which is arranged in the first gas supply line 24 upstream of the first gas inlet 22. In this context, the term "upstream" refers to the direction of flow of gas through the first gas supply line 24.

By directing the gas to be supplied to the process chamber 12 via the first gas inlet 22 through the further pressure equalization container 54 prior to entering the process chamber 12, pressure differences occurring in the first gas supply line 24 upstream of the first gas inlet 22 and in the process chamber 12, for example due to temperature differences developing during operation of the apparatus 10 can be compensated for. Thus, the presence of the further pressure equalization container 54 allows gas to be supplied to the process chamber 12 via the first gas inlet 22 in a particularly uniform manner. Otherwise the structure and the function of the apparatus 10 according to FIG. 4 correspond to the structure and the function of the apparatus 10 depicted in FIGS. 1 and 2.

Also specific features of the apparatus 10 for producing a three-dimensional work piece have been described herein with reference to specific embodiments, these features can be combined as desired. For example, the apparatus 10 according to FIG. 3 can be equipped with a further pressure equalization container 54.

The invention claimed is:

1. An apparatus for producing a three-dimensional work piece, the apparatus comprising:
  a process chamber accommodating a carrier for receiving a raw material powder,
  an irradiation device for selectively irradiating electromagnetic or particle radiation onto the raw material powder on the carrier in order to produce a work piece made of the raw material powder by an additive layer construction method,
  a first gas inlet for supplying gas to the process chamber and a gas outlet for discharging gas from the process chamber, wherein the first gas inlet and the gas outlet are configured and arranged in such a manner that a first gas flow across the carrier is generated,
  a transmission element which allows the transmission of the electromagnetic or particle radiation emitted by the irradiation device into the process chamber and which is accommodated in a top wall of the process chamber, and a second gas inlet for supplying gas to the process chamber, wherein the second gas inlet is configured and arranged at least in the top wall of the process chamber in such a manner that a second gas flow in a direction of the carrier facing away from the transmission element is generated, wherein the second gas flow is in a direction substantially perpendicular to the top wall of the process chamber and substantially perpendicular to the carrier, and wherein the second gas inlet includes a plurality of gas inlet openings in the top wall that are distributed adjacent the transmission element to define a second gas inlet area arranged substantially parallel to the carrier.

2. The apparatus according to claim 1,
further comprising a control unit which is adapted to control the supply of gas to the process chamber in such a manner that a volume flow of gas into the process chamber via the second gas inlet is larger than a volume flow of gas into the process chamber via the first gas inlet.

3. The apparatus according to claim 1,
wherein the second gas inlet area comprises a first portion which is arranged in the top wall of the process chamber and a second portion which is arranged in a side wall of the process chamber, wherein the side wall of the process chamber in particular accommodates the first gas inlet.

4. The apparatus according to claim 1,
further comprising a pressure equalization container which is arranged in a gas supply line upstream of the second gas inlet.

5. The apparatus according to claim 4,
wherein the pressure equalization container is integrated into a wall of the process chamber.

6. The apparatus according to claim 4,
wherein at least one of the second gas inlet and the transmission element is arranged in a wall of the pressure equalization container which faces the process chamber.

7. The apparatus according to claim 4,
wherein the pressure equalization container comprises a first portion which is integrated into the top wall of the process chamber and a second portion which is integrated into a side wall of the process chamber, wherein the side wall of the process chamber in particular accommodates the first gas inlet.

8. The apparatus according to claim 1,
further comprising a pressure equalization container which is arranged in a gas supply line upstream of the first gas inlet.

9. An apparatus for producing a three-dimensional work piece, the apparatus comprising:
a process chamber accommodating a carrier for receiving a raw material powder,
an irradiation device for selectively irradiating electromagnetic or particle radiation onto the raw material powder on the carrier in order to produce a work piece made of the raw material powder by an additive layer construction method,
a transmission element which allows the transmission of the electromagnetic or particle radiation emitted by the irradiation device into the process chamber and which is accommodated in a top wall of the process chamber, and
a first gas inlet for supplying gas to the process chamber, wherein the first gas inlet includes a plurality of openings at least partially arranged in the top wall of the process chamber that are distributed adjacent the transmission element and configured to supply gas to the process chamber in such a manner that a first gas flow in a direction toward the carrier and substantially perpendicular to the top wall of the process chamber is generated.

10. The apparatus of claim 9, further comprising:
a second gas inlet for supplying gas to the process chamber and a gas outlet for discharging gas from the process chamber, wherein the second gas inlet and the gas outlet are configured and arranged in such a manner that a second gas flow across the carrier is generated, and
a control unit which is adapted to control the supply of gas to the process chamber in such a manner that a volume flow of gas into the process chamber via the first gas inlet is larger than a volume flow of gas into the process chamber via the second gas inlet.

11. The apparatus of claim 10, wherein the first gas inlet includes a first gas inlet area, wherein the first gas inlet area comprises a first portion which is arranged in the top wall of the process chamber and a second portion which is arranged in a side wall of the process chamber, and wherein the side wall of the process chamber accommodates the second gas inlet.

12. The apparatus of claim 10, further comprising a pressure equalization container which is arranged in a gas supply line upstream of the first gas inlet.

13. The apparatus of claim 12, wherein the pressure equalization container is at least partially integrated into the top wall of the process chamber.

14. The apparatus of claim 12, wherein the first gas inlet and the transmission element are arranged in a wall of the pressure equalization container which faces the process chamber.

15. The apparatus of claim 12, wherein the pressure equalization container includes a first portion which is integrated into the top wall of the process chamber and a second portion which is integrated into a side wall of the process chamber, and wherein the side wall of the process chamber accommodates the second gas inlet.

16. The apparatus of claim 12, further comprising a second pressure equalization container which is arranged in a gas line upstream of the second gas inlet.

17. An apparatus for producing a three-dimensional work piece, the apparatus comprising:
a process chamber accommodating a carrier for receiving a raw material powder,
an irradiation device for selectively irradiating electromagnetic or particle radiation onto the raw material powder on the carrier in order to produce a work piece made of the raw material powder by an additive layer construction method,
a transmission element which allows the transmission of the electromagnetic or particle radiation emitted by the irradiation device into the process chamber and which is accommodated in a top wall of the process chamber, and
a first gas inlet for supplying gas to the process chamber, wherein the first gas inlet is at least partially arranged in the top wall of the process chamber, and wherein the first gas inlet includes a plurality of gas inlet openings distributed across the top wall adjacent the transmission element in a first gas inlet area arranged substantially parallel to the carrier.

18. The apparatus of claim 17, further comprising:
a second gas inlet for supplying gas to the process chamber and a gas outlet for discharging gas from the process chamber, and
a control unit which is adapted to control the supply of gas to the process chamber in such a manner that a volume flow of gas into the process chamber via the first gas inlet is larger than a volume flow of gas into the process chamber via the second gas inlet.

19. The apparatus of claim 18, wherein the first gas inlet area comprises a first portion which is arranged in the top wall of the process chamber and a second portion which is arranged in a side wall of the process chamber, and wherein the side wall of the process chamber accommodates the second gas inlet.

20. The apparatus of claim 18, further comprising:
a first pressure equalization container which is arranged in a gas supply line upstream of the first gas inlet, and
a second pressure equalization container which is arranged in a gas line upstream of the second gas inlet.

* * * * *